US012488639B2

(12) United States Patent
Teschner et al.

(10) Patent No.: US 12,488,639 B2
(45) Date of Patent: Dec. 2, 2025

(54) DATA MANAGEMENT DEVICE FOR A TWO-WHEELED VEHICLE

(71) Applicant: Robert Bosch GmbH, Stuttgart (DE)

(72) Inventors: Alexander Teschner, Reutlingen (DE); Andreas Friese, Pfalzgrafenweiler (DE); Bjoern Mayer, Wannweil (DE); Christof Kaerner, Albershausen (DE); Daniel Poganatz, Renningen (DE); Felix Gutbrodt, Leinfelden-Echterdingen (DE); Jochen Schueler, Dusslingen (DE); Patrick Millen, Metzingen (DE); Peter Matt, Salmendingen (DE); Sebastian Schmidt, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 399 days.

(21) Appl. No.: 17/777,712

(22) PCT Filed: Dec. 1, 2020

(86) PCT No.: PCT/EP2020/084031
§ 371 (c)(1),
(2) Date: May 18, 2022

(87) PCT Pub. No.: WO2021/110632
PCT Pub. Date: Jun. 10, 2021

(65) Prior Publication Data
US 2022/0398877 A1    Dec. 15, 2022

(30) Foreign Application Priority Data
Dec. 3, 2019    (DE) .................... 10 2019 218 724.2

(51) Int. Cl.
*G07C 5/08*       (2006.01)
*B62J 50/22*      (2020.01)
(Continued)

(52) U.S. Cl.
CPC ............ *G07C 5/0808* (2013.01); *B62J 50/22* (2020.02); *G07C 5/008* (2013.01); *G07C 5/0825* (2013.01); *H04L 43/0811* (2013.01)

(58) Field of Classification Search
CPC .... G07C 5/0808; G07C 5/008; G07C 5/0825; B62J 50/22; H04L 43/0811; G06V 20/56
See application file for complete search history.

(56) References Cited

U.S. PATENT DOCUMENTS 9,399,500 B1 *   7/2016   Hashimoto ............ B62M 9/122
9,491,788 B1 *   11/2016  Kasai ..................... H04W 4/80
(Continued)

FOREIGN PATENT DOCUMENTS

CN    101397042 A    4/2009
CN    102901885 A    1/2013
(Continued)

OTHER PUBLICATIONS

International Search Report for PCT/EP2020/084031, Issued Feb. 19, 2021.
(Continued)

*Primary Examiner* — John B Walsh
*Assistant Examiner* — Hassan Abdur-Rahman Khan
(74) *Attorney, Agent, or Firm* — NORTON ROSE FULBRIGHT US LLP

(57) ABSTRACT

A data management device for a two-wheeled vehicle, in particular an e-bike, pedelec, or the like, for the management and/or the diagnosis of operating data of the two-wheeled vehicle. The device includes a first communication interface for wireless communication with wireless two-wheeled
(Continued)

vehicle devices of the two-wheeled vehicle, a second communication interface designed for communication with at least one two-wheeled vehicle system device, a third communication interface for the in particular authenticated and/or encrypted communication with a diagnostic device for the at least partial provision, modification, deletion, and/or retrieval of operating data of the two-wheeled vehicle, and a data management component for the management of operating data of wireless two-wheeled vehicle devices. The data management component being connected to the third communication interface and being designed to receive, to modify, to delete, and/or to provide operating data.

16 Claims, 3 Drawing Sheets

(51) Int. Cl.
*G07C 5/00* (2006.01)
*H04L 43/0811* (2022.01)

(56) References Cited

U.S. PATENT DOCUMENTS

| | | | | |
|---|---|---|---|---|
| 10,259,311 | B2* | 4/2019 | Biderman | B62B 5/004 |
| 2007/0158949 | A1* | 7/2007 | Le Gars | G07B 15/02 |
| | | | | 290/7 |
| 2013/0027052 | A1* | 1/2013 | Matsumoto | B62J 50/21 |
| | | | | 324/511 |
| 2016/0257370 | A1* | 9/2016 | Hashimoto | B62K 23/02 |
| 2016/0321845 | A1* | 11/2016 | Maeda | G07C 5/008 |
| 2018/0127058 | A1* | 5/2018 | Rodgers | B62M 9/122 |
| 2019/0149645 | A1* | 5/2019 | Montez | B62J 43/30 |
| | | | | 455/556.1 |
| 2020/0262511 | A1* | 8/2020 | Hahn | B62J 45/413 |
| 2021/0081863 | A1* | 3/2021 | Gonzalez | G06Q 10/06312 |
| 2022/0398877 | A1* | 12/2022 | Teschner | G07C 5/085 |
| 2023/0410571 | A1* | 12/2023 | Friese | G07C 5/0808 |

FOREIGN PATENT DOCUMENTS

| | | |
|---|---|---|
| CN | 103342145 A | 10/2013 |
| CN | 104210613 A | 12/2014 |
| CN | 204903761 U | 12/2015 |
| CN | 105270558 A | 1/2016 |
| CN | 107209201 A | 9/2017 |
| DE | 102015109203 A1 | 12/2015 |
| DE | 102016006998 A1 | 1/2017 |
| DE | 102017125490 A1 | 5/2019 |
| DE | 102017220245 A1 | 5/2019 |
| EP | 3538424 A1 | 9/2019 |
| JP | 2010095207 A | 4/2010 |
| JP | 2017132444 A | 8/2017 |
| JP | 2018103688 A | 7/2018 |
| JP | 2019069664 A | 5/2019 |
| WO | 2018107978 A1 | 6/2018 |

OTHER PUBLICATIONS

Wikipedia, "Internet of Things," 2021, pp. 1-41. <https://en.wikipedia.org/wiki/Internetofthings>.
Shimano, "Dealer's Manual Road MTB Trekking City Touring/Comfort Bike Urban Sport E-Bike XTR DI2 M9050 Series XTR Contents," 2017, pp. 1-113.

* cited by examiner

DATA MANAGEMENT DEVICE FOR A TWO-WHEELED VEHICLE

FIELD

The present invention relates to a data management device for a two-wheeled vehicle, in particular an e-bike, pedelec, or the like, and to the management and/or diagnosis of operating data of the two-wheeled vehicle, in particular data of connections to wireless two-wheeled vehicle devices.

In addition, the present invention relates to a diagnostic device for a two-wheeled vehicle, in particular an e-bike, pedelec, or the like, for the diagnosis of operating data of the two-wheeled vehicle, in particular data of connections to wireless two-wheeled vehicle devices, and for communication with a data management device.

In addition, the present invention relates to a two-wheeled vehicle system including a two-wheeled vehicle and a diagnostic device.

In addition, the present invention relates to a method for managing operating data of a two-wheeled vehicle, in particular for the management and/or diagnosis of data of connections to wireless two-wheeled vehicle devices.

Although the present invention is generally applicable to any two-wheeled vehicles, the present invention is described in relation to bicycles in the form of e-bikes.

BACKGROUND INFORMATION

Wireless components, in the form of so-called smart devices, have come into use in the bicycle industry. Various bicycle components having various radio interfaces are available in the related art. These include for example locks, gear shifting mechanisms, tire pressure sensors, etc. In particular electric bicycles, also called e-bikes, are particularly suitable for expansion with such expansion components, because an interaction with the core components of an e-bike, such as the drive, display, battery, or the like, can be advantageous. In the following, the core components are also referred to as two-wheeled vehicle system devices. In this way, for example the following can be enabled:
  a display of information of these connected expansion components on a display of the e-bike,
  a controlling of the connected expansion components by the e-bike system, or
  an expansion of the functionality of the "e-bike system" through connected expansion components.

For the wireless connection of the expansion components to the e-bike, an initial coupling is required, i.e., a connection setup, "notification," of the respective wireless expansion components to the e-bike system. During the connection, further parameters can also be communicated, for example for the configuration of the components. For the management and testing of the connected components, status information about the components can also be provided. Due to the inhomogeneity of the multiplicity of possible components, these data are individual for each expansion component. These include for example
  unique identifier of the component, such as name, Bluetooth address, ID, or the like,
  communication profile/interface definitions,
  requests for the encryption of the communication, -authentication data,
  status information, or
  setting parameters.

The initial coupling process is in addition often carried out manually. For example, the various connection parameters have to be configured, the connection setup has to be initiated, and the connection has to be subsequently checked. In particular in the area of manufacturing, i.e., at the manufacturer of the bicycle, and maintenance, i.e., at the respective dealer, the configuration and checking of the connections and associated components has to take place quickly, conveniently, reliably, and in a standardized manner.

SUMMARY

In a specific example embodiment, the present invention provides a data management device for a two-wheeled vehicle, in particular an e-bike, pedelec, or the like, for the management and/or diagnosis of operating data of the two-wheeled vehicle, in particular data of connections to wireless two-wheeled vehicle devices, including:
  a first communication interface for wireless communication with wireless two-wheeled vehicle devices of the two-wheeled vehicle, preferably based on Bluetooth, WLAN, and/or ANT+,
  a second communication interface designed for communication with at least one two-wheeled vehicle system device,
  a third communication interface for the in particular authenticated and/or encrypted communication with a diagnostic device for the at least partial provision, modification, deletion, and/or retrieval of operating data of the two-wheeled vehicle, and a data management component at least for the management of operating data of wireless two-wheeled vehicle devices, the data management component being connected to the third communication interface and being designed to receive, to modify, to delete, and/or to provide operating data, the operating data including at least data for the communication of one or more wireless two-wheeled vehicle devices with the first communication interface and/or data for operating and/or diagnosing the respective wireless two-wheeled vehicle devices, and the data management component being designed to communicate, in particular in authenticated and/or encrypted fashion, wirelessly with the one or more wireless two-wheeled vehicle devices on the basis of the managed operating data.

In a further specific example embodiment, the present invention provides a diagnostic device for a two-wheeled vehicle, in particular an e-bike, pedelec, or the like, for the diagnosis of operating data of the two-wheeled vehicle, in particular data of connections to wireless two-wheeled vehicle devices, and for communication with a data management device as described above, the diagnostic device having a first interface for communication with the data management device and in particular having a second interface for communication with an external storage device, preferably a cloud storage device.

In a further specific example embodiment, the present invention provides a two-wheeled vehicle, in particular an e-bike, pedelec, or the like, including a data management device as described above and at least one two-wheeled vehicle system device that is connected to the second communication interface of the data management device.

In a further specific embodiment, the present invention provides a two-wheeled vehicle system including a two-wheeled vehicle as described herein and a diagnostic device as described herein that is connectable, in particular wirelessly, to the data management device for preferably bidirectional communication.

In a further specific example embodiment, the present invention provides a method for the management of operating data of a two-wheeled vehicle, in particular for the management and/or diagnosis of date of connections to wireless two-wheeled vehicle devices, including the steps:
  providing operating data of wireless two-wheeled vehicle devices, in particular through a diagnostic application of a diagnostic device, the operating data including data for the communication of one or more wireless two-wheeled vehicle devices and/or data for the operation and/or for the diagnosis of the respective wireless two-wheeled vehicle devices,
  storing the operating data in a storage device of a data management device as described herein in the two-wheeled vehicle,
  setting up a communication connection, using the data management device, with a wireless two-wheeled vehicle device based on the stored operating data associated with the respective wireless two-wheeled vehicle device, and in particular
  communicating at least a part of the operating data to the wireless two-wheeled vehicle device via the set-up communication connection, for the configuration thereof.

One of the advantages thereby achieved is that, in a simple and reliable manner, wireless components for a two-wheeled vehicle, i.e., wireless two-wheeled vehicle devices, as well as their connections, can be set up or configured. A further advantage is that the management of the corresponding operating data of the wireless two-wheeled vehicle devices can be carried out in a flexible manner. A further advantage is that a configuration of the required wireless connections, as well as their management and diagnosis, is enabled that is independent of the respective wireless two-wheeled vehicle device. A further advantage is the possibility of an interaction with a diagnostic application: in this way, data sets can be edited; for example, parameters of wireless two-wheeled vehicle components can be modified or deleted. Operating data can be retrieved, for example for gathering information, and can be stored, for example in a cloud, for further processing or archiving.

Further features, advantages, and further specific embodiments of the present invention are described in the following, or are made apparent thereby.

According to an advantageous development of the present invention, the data management device has at least one of the following devices: a storage device, a display device, a human-machine interface for the operation of the data management device by a user. An advantage of this is that an editing, displaying, or storing of operating data by an (end) user of the two-wheeled vehicle is enabled, which improves flexibility with respect to the configuration for the operation of the wireless two-wheeled vehicle devices.

According to a further advantageous development of the present invention, the data management device is designed to at least partly itself ascertain operating data for wireless two-wheeled vehicle devices. This substantially facilitates the operability and later commissioning of wireless two-wheeled vehicle devices. In this way, a complicated configuration or initialization by a user is avoided.

According to a further advantageous development of the present invention, the data management device monitors the first communication interface for the reception and evaluation of radio signals and for the extraction of operating data from the evaluated radio signals. The advantage of this is that in this way the data management device can easily itself ascertain operating data for wireless two-wheeled vehicle devices.

According to a further advantageous development of the present invention, a third communication interface is provided for in particular encrypted and/or authenticated communication with a diagnostic device for the at least partial provision, modification, and/or removal of operating data of wireless two-wheeled vehicle devices. The advantage of this is that in this way for example a dealer and/or manufacturer can easily and reliably edit operating data.

According to a further advantageous development of the present invention, the operating data include, for each wireless two-wheeled vehicle device, a data set that includes outputtable, non-editable information and modifiable operating parameters for the wireless two-wheeled vehicle device. In this way, operating data can easily provided for each wireless two-wheeled vehicle device. In the sense of the present invention, a non-editable item of information is an item of information that is not modifiable from the outside, for example by a diagnostic device or the like. A non-editable item of information is for example a changing signal strength value that is a function of the spatial distance of a wireless expansion component from the data management device. The signal strength value is thus an item of information that can change but that is not modifiable in the sense of an editing by the diagnostic device. Another example is a non-editable device name, which in addition is not a changing variable.

According to a further advantageous development of the present invention, the data management device is designed to set up, via the first communication interface, a separate, direct, in particular authenticated and/or encrypted connection with each wireless two-wheeled vehicle device. The advantage of this is that the data management device can communicate directly with each wireless two-wheeled vehicle device, in a so-called star network. In this way, a complicated transmission or indirect communication with a first wireless two-wheeled vehicle device via a second wireless two-wheeled vehicle device is not required.

According to a further advantageous development of the present invention, the data management device is designed to receive data of a first wireless two-wheeled vehicle device and/or of a first two-wheeled vehicle system device, and to provide the received data via a connection to a second wireless two-wheeled vehicle device and/or to a second two-wheeled vehicle system device. In this way, data from a first expansion component can be exchanged with a second expansion component indirectly, via the data management device, in unidirectional or also bidirectional fashion. A bidirectional transmission to core components or two-wheeled vehicle system devices is also possible.

According to a further advantageous development of the diagnostic device in accordance with the present invention, the diagnostic device is designed to carry out at least one of the following steps:
  Representing information about wireless connections.
  Representing information about wireless two-wheeled vehicle devices with which a wireless connection can be set up.
  Creating a local copy of operating data for the at least partial modification of the operating data.
  Producing operating data for at least one wireless two-wheeled vehicle device.
  Communicating modified and/or produced operating data to the data management device.

Storing operating data locally and/or on the external storage device, preferably in synchronized fashion.

The advantage of this is that in this way a user of the diagnostic device is provided, in a flexible manner, with a multiplicity of configuration and editing possibilities. Further important features and advantages of the present invention result from the figures, and from the associated description of the figures.

Of course, the features named above and explained in the following may be used not only in the respectively indicated combination, but also in other combinations, or by themselves, without departing from the scope of the present invention.

Preferred embodiments and specific embodiments of the present invention are shown in the figures and are explained in more detail in the following description, in which identical reference characters designate identical or similar or functionally identical components or elements.

DETAILED DESCRIPTION OF EXAMPLE EMBODIMENTS

Figure 1:
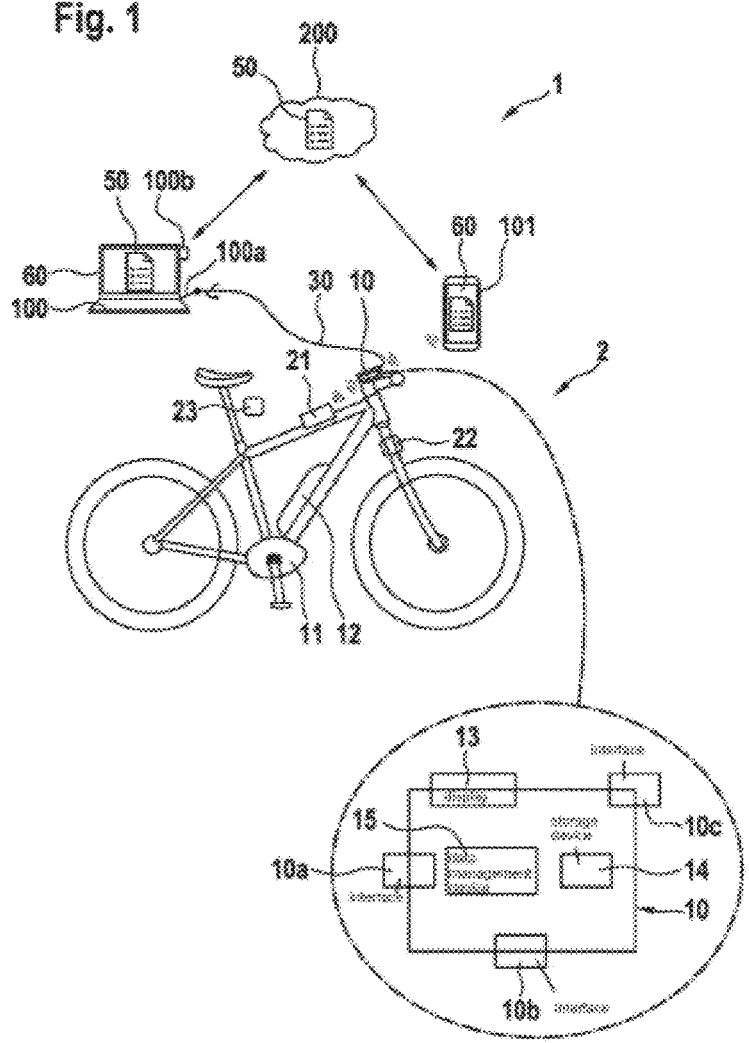
FIG. 1 shows a two-wheeled vehicle system according to a specific example embodiment of the present invention.

FIG. 1 shows a two-wheeled vehicle system according to a specific embodiment of the present invention.

In detail, FIG. 1 shows a two-wheeled vehicle system 1. Two-wheeled vehicle system 1 has, inter alia, an e-bike 2. E-bike 2 includes a data management device 10, designated in the following as system access component, which is connected wirelessly via a first interface 10a to a wireless expansion component 21 for e-bike 2. Via a second wire-bound interface 10b, system access component 10 is connected to system components 11, 12 of e-bike 2, for example an energy storage device 12 for supplying energy to a drive 11 of e-bike 2 and to further two-wheeled vehicle system devices. In addition, system access component 10 has a display device 13, for example for displaying the charge state of energy storage device 12, or data of wireless expansion component 21. In addition, system access component 10 has a storage device 14 and a data management component 15 in the form of a programmable logic unit for operating system access component 10. In addition, system access component 10 is connected via a third interface 10c, via a cable 30, to a diagnostic device 100. Diagnostic device 100 can be for example a computer, a tablet, or the like on which a diagnostic application 60 runs. In FIG. 1, diagnostic device 100 has a USB interface 100a that is connected to system access component 10, or more precisely to its interface 10c. Via diagnostic device 100, data sets 50 of operating data of wireless expansion component 21, and also of the further expansion components 22, 23 not fastened to the e-bike and/or system components 11, 12 of e-bike 2, can be edited, modified, deleted, produced, or the like. The editing can for example be carried out using an optical scanner, using a touchscreen, keyboard, input stylus, or the like. In addition, diagnostic device 100 has a second interface 100b with which it is connected to an online storage device 200, this interface synchronizing operating data 50 with online storage device 200. In addition, online storage device 200 can provide an interface with which corresponding operating data 50 can be accessed via a mobile radiotelephone network, for example an app 60 on a mobile radiotelephone device 101. These data can in turn be provided to system access component 10 via mobile radiotelephone device 101 and a corresponding wireless interface. Also possible is a direct reading out of operating data 50 by diagnostic application 60, or the app on mobile radiotelephone device 101, via first interface 10a.

System access component 10 thus acts substantially as a central access to e-bike 2, and has at least one of the following functionalities:

wireless access to e-bike system 1 via radio interfaces, in particular stelliform connection of wireless expansion components 21, 22, 23 for e-bike system expansion, connection of a diagnostic application 60 in the form of an app on a mobile radiotelephone device 101 in the form of a smart phone, tablet, or the like, temporary, wire-based access 30 to e-bike system 1, for example diagnostic application 60 via USB to a diagnostic device 100, communication to core or system components 11, 12 of e-bike system 1, for example drive 11, battery 12, etc., management of the wireless connections to wireless expansion components 21, 22, 23 on the basis of a data set 50 having a suitable diagnostic application 60, provision of information from data set 50 to wireless expansion components 21, 22, 23.

System access component 10 is not limited to this functionality. Depending on the embodiment, further functionalities may be integrated, such as human-machine interfaces, storage devices 14, further interfaces, or the like.

For the provision of data, configuration, and error analysis of the core or system components 11, 12 of e-bike system 1, here a diagnostic application 60 is used. This diagnostic application 60 is installed by the manufacturer and dealer for maintenance, for example on a PC 100 or other suitable terminal devices. This device can then be connected to system access component 10 of e-bike 2 by USB or by radio. In this way, the configuration, the management, and the diagnosis of the wireless connections of wireless expansion components 21, 22, 23 can be carried out. Alternatively or in addition, an app 60 belonging to e-bike system 1 can be provided with such functions, and these can be for example wirelessly connected to system access component 10. This app can be used for example by end users.

Data set 50 for managing wireless connections can for example contain at least one of the following editable parameters, and can contain only readable information per connection/component:

identification data, such as Bluetooth device address or the like name of the device/identifier interface parameters parameters for activating/deactivating a connection-parameters for modification/access rights signal quality of the wireless connections, for example signal strength or the like additional information, such as installation position, numbering, instance, category, or the like parameters for encryption and authentication, for example status, keys, certificates, or the like setting parameters status information about the components Data set 50, or the data fields of the data set, can be expanded depending on the case of application or requirements.

Data set 50 is permanently available within e-bike system 1, and is also partly modifiable as needed. System access component 10 of e-bike 2 initially sets up the wireless connections based on the information of data set 50, manages these connections, and can provide data about the connected components or wireless connections. For example, system access component 10 of e-bike 2 can initially fill, and continuously update, data set 50 with information of available wireless expansion components 21, 22, 23 in the vicinity. These include, depending on availability/receptibility, for example identifiers, names, communication addresses, items of status information, signal quality, or the like. This is advantageous in particular in the case of required adaptations of data set 50. A particular advantage is for example the simple activation of a wireless connection through a modification of the respective parameter in data set 50. A further advantage is the simple addition or removal of further wireless expansion components 21, 22, 23, as well as the retrieval of status information and the modification of operating parameters. It is also possible to create data set 50 externally, i.e. outside e-bike 2, for example in diagnostic application 60 or in a web application/cloud 200, and to then synchronize this with system access component 10.

Here, the data set can also be a part of a more extensive overall data set of e-bike system 1.

A modification or parameterization of connections can take place through the editing of parameters of data set 50. The following can for example be provided:
  searching data set 50 for connections and/or components, including modification of associated data,
  modifying parameters,
  adding data fields or entering components and/or connections, and/or
  removing data fields or entering components and/or connections The editing of data set 50 here takes place through diagnostic application 60. As already explained, this application can be installed on a PC 100 or smart phone 101, and can be connected to system access component 10 of e-bike 2 by USB, i.e. by cable and/or by radio, i.e., wirelessly. For the editing of data set 50, any standard methods are suitable, such as input via a keyboard or other input devices, such as an optical scanner, touchscreen, input stylus, or the like. The selection or modification of parameters can be done by mouse click or by selection on a touch-sensitive screen. Editing can also take place using a configurator, such as a wizard, or using dialogue fields.

Editing can take place either directly, or on the basis of a copy of data set 50 in diagnostic application 60, with subsequent synchronization. Depending on the application, or the case of use, a data set 50 can also be used only in limited fashion; for example some parameters may be editable, and others only readable, i.e. not modifiable.

Diagnostic application 60 can read out data set 50 in order for example to
  represent information about wireless connections,
  represent information about the associated components,
  obtain a local copy for modifications to the data set, and/or
  store, or synchronize, the data set locally or in an online storage device, for example a data cloud.

Figure 2:
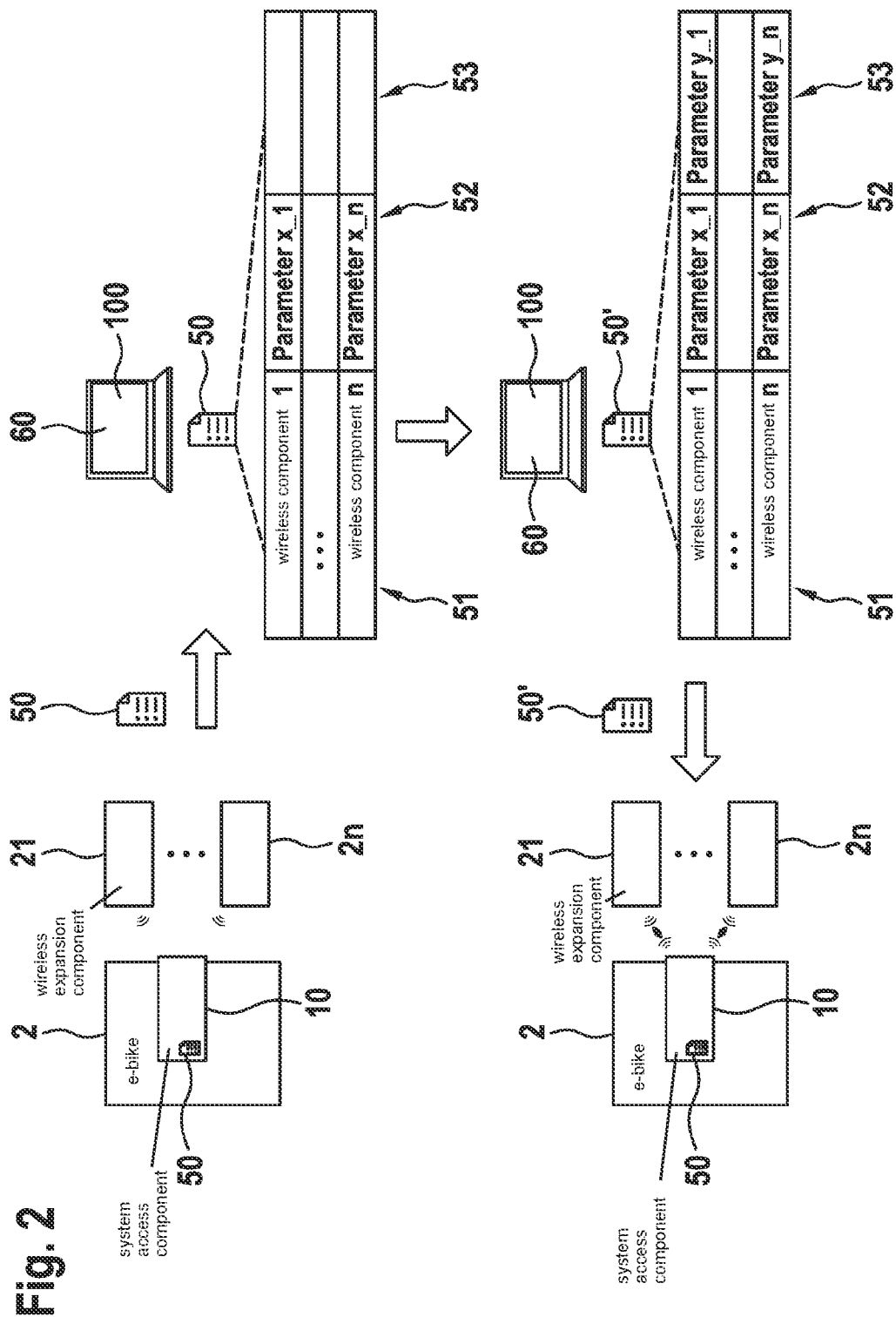
FIG. 2 shows steps of a method according to a specific embodiment of the present invention.

FIG. 2 shows steps of a method according to a specific embodiment of the present invention.

In detail, in FIG. 2 data set 50 of system access component 10 of e-bike 2 is initially created and partly filled before connections are set up. The initial, partial filling is also done by system access component 10. For example, radio signals are received from the surrounding environment from active wireless expansion components 21, 22, 23, and information extractable therefrom is stored in data set 50, such as parameters and items of status information, such as device name 51, communication address 52, signal parameter 53, and the like. This data set 50 is then provided to diagnostic application 60 for further processing. There, for example parameters can be modified or added, in particular the parameters for the connection setup, such as activation parameters, configurations, and the like. After the processing, modified data set 50', or the modified parameters, are sent back to system access component 10 of e-bike 2. The connection setup in the management of the connections can take place on the basis of modified data set 50'.

Alternatively or in addition, data set 50 in diagnostic application 60 can be initially produced or assembled before the setup of connections. This data set contains, per wireless expansion component 21, 22, 23, various parameters 51, 52, 53 for the connection setup and the parameterization of the wireless expansion components 21, 22, 23. The number and type of parameters 51, 52, 53 here depends on the requirements, and can vary. After being created, data set 50 is sent to system access component 10 of e-bike system 1. The system access component then initially sets up the connections to the individual wireless expansion components 21, 22, 23 in stelliform fashion, based on this data set 50. A direct connection between the wireless expansion components 21, 22, 23 is not provided. Subsequently, data set 50 is permanently stored in system access component 10, so that, upon each system start, the connections can be reestablished, and information can be provided about the connections and wireless expansion components, based on this data set 50.

The following variant is also possible: here, data set 50 is made up of two parts. A first part is produced externally by diagnostic application 60, and a second part can be produced by system access component 10.

In addition, the existing data set 50 can the communication connections are thus already initially set up and are read out and subsequently edited independent of the production method with diagnostic application 60. Data set 50 includes not only editable parameters 51, 52, 53, but, in order to inform a user, also contains readable information data about wireless expansion components 21, 22, 23. In the example, data set 50 is edited with the aid of diagnostic application 60. Specifically, for example a parameter of wireless expansion component 21 can be modified. After the sending back of the modified data set 50, or of the modified parameter 51, 52, 53, there takes place an adaptation of the connection to the wireless expansion component 21. Here, the specific function of the modified parameter 51, 52, 53 is not considered, because this can be any parameter, for example a parameter for communication configuration, a parameter for the configuration of the wireless expansion component, or the like. The information in data set 50 can be used for adaptations of parameters 51, 52, 53, or for display purposes in diagnostic application 60.

During the editing, a further wireless expansion component 22 to be connected can also be added to data set 50. After the sending back of data set 50 to system access component 10, the connection can be set up to wireless expansion component 22. A configuration of wireless expansion component 22 is also possible.

Diagnostic application 60 is not limited, as shown in the example, to an application on a PC 100. An app 60 having diagnostic functionalities on a smartphone 101 or tablet is also possible. In addition, the connection between diagnostic application 60 and system access component 10 of e-bike 2 can be made in wire-bound fashion or wirelessly.

The creation, searching, and modification of data set 50 can take place with the aid of conventional methods, such as keyboard inputs, touch displays, scanning in of optical codes with parameters coded therein, selection lists, wizards, or the like; this is important in particular with regard to the various requirements of the various user groups of diagnostic application 60, for example process time limiting in the production environment, end customer with app, or the like.

Figure 3:
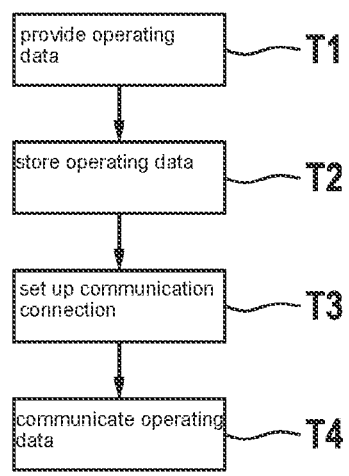
FIG. 3 shows steps of a method according to an embodiment of the present invention.

FIG. 3 shows steps of a method according to an embodiment of the present invention.

In detail, FIG. 3 shows steps of a method for managing operating data of a two-wheeled vehicle, in particular an e-bike, pedelec, or the like. The method includes the steps: In a first step T1, operating data of wireless two-wheeled vehicle devices are provided, in particular through a diagnostic application of a diagnostic device, the operating data including data for the communication of one or more wireless two-wheeled vehicle devices and/or data for the operation and/or for the diagnosis of the respective wireless two-wheeled vehicle devices.

In a second step T2, there takes place a storing of the operating data in a storage device of a data management device as disclosed herein in the two-wheeled vehicle.

In a third step T3, there takes place a setting up of a communication connection by the data management device with a wireless two-wheeled vehicle device based on stored operating data associated with the wireless two-wheeled vehicle device.

In a final step T4, a communication can take place of at least a part of the operating data to the wireless two-wheeled vehicle device via the set-up communication connection, for the configuration thereof.

In sum, the at least one of the specific embodiments of the present invention has at least one of the following advantages:

component-independent configuration of the required connections, as well as the management and diagnosis thereof,
simple production and modification of data sets,
high flexibility for adaptation to various cases of application,
high flexibility with regard to the type of device for the diagnostic application and the connection thereof,
simple expandability, for example cloud connection, visual representation, offline creation of data sets, or the like,
simple operation for a user.

Although the present invention has been described on the basis of preferred exemplary embodiments, it is not limited thereto, but rather can be modified in many ways.

Thus, in a further exemplary embodiment a data management device is likewise to be provided for a two-wheeled vehicle 2, in particular an e-bike, pedelec, or the like, for the management and/or the diagnosis of operating data 50 of two-wheeled vehicle 2, in particular data of connections to wireless two-wheeled vehicle devices 21, . . . , 2n, having the following as stated and described above:

a first communication interface 10a for wireless communication with wireless two-wheeled vehicle devices 21, . . . , 2n of two-wheeled vehicle 2, and
a third communication interface 10c for in particular authenticated and/or encrypted communication 30 with a diagnostic device 100 for the at least partial provision, modification, deletion, and/or retrieval of operating data 50 of two-wheeled vehicle 2, and
a data management component 15 at least for the management of operating data of wireless two-wheeled vehicle devices 21, . . . , 2n.

In this further exemplary embodiment as well, data management component 15 is connected to third communication interface 10c and is designed to receive, modify, delete, and/or provide operating data 50, the operating data 50 including at least data for the communication of one or more wireless two-wheeled vehicle devices 21, . . . , 2n with first communication interface 10a, and/or data for the operation and/or for the diagnosis of the respective wireless two-wheeled vehicle devices 21, . . . , 2n, and data management component 15 being designed to communicate, in particular in authenticated and/or encrypted fashion, wirelessly with the one or more wireless two-wheeled vehicle devices 21, . . . , 2n for the exchange of data, on the basis of the managed operating data 50. In addition, in this further exemplary embodiment all features and developments are likewise provided as stated in the above exemplary embodiments.

What is claimed is:

1. A data management device with communication interfaces for a two-wheeled vehicle for management and/or diagnosis of operating data of the two-wheeled vehicle connections to wireless two-wheeled vehicle devices, comprising:

a first communication interface comprising a wireless transceiver configured to operate using Bluetooth, WLAN, or ANT+ protocols configured protocols for wireless communication with the wireless two-wheeled vehicle devices of the two-wheeled vehicle;

a second communication interface comprising a wired connector or bus connection configured to transmit and receive data with at least one two-wheeled vehicle system device;

a hardware implemented third communication interface comprising a secure communication link configured for authenticated and/or encrypted data exchange with a diagnostic device for an at least partial provision, and/or modification, and/or deletion, and/or retrieval of operating data of the two-wheeled vehicle; and a data management component, comprising a processor and a storage device, wherein the processor is configured at least for management of operating data of the wireless two-wheeled vehicle devices, and is connected to the third communication interface, the processor being configured to receive, and/or to modify, and/or to delete, and/or to provide the operating data, the operating data including: (i) data for the communication of one or more of the wireless two-wheeled vehicle devices with the first communication interface, and/or (ii) data for operating and/or diagnosing respective wireless two-wheeled vehicle devices of the two-wheeled vehicle, and wherein the data management component is configured to communicate, in authenticated and/or encrypted fashion, wirelessly with the one or more of the wireless two-wheeled vehicle devices based on the managed operating data.

2. The data management device as recited in claim 1, wherein the two-wheeled vehicle is an e-bike or a pedelec.

3. The data management device as recited in claim 1, wherein the first communication interface is configured for wireless communication with the wireless two-wheeled vehicle devices of the two-wheeled vehicle based on Bluetooth and/or WLAN and/or ANT+.

4. The data management device as recited in claim 1, wherein the data management device includes at least one of the following devices: a storage device, a display device, a human-machine interface for operation of the data management device by a user.

5. The data management device as recited in claim 1, wherein the data management device is configured to at least partly itself ascertain operating data for the wireless two-wheeled vehicle devices.

6. The data management device as recited in claim 5, wherein the data management device is configured to monitor the first communication interface for reception and evaluation of radio signals and extraction of the operating data from the evaluated radio signals.

7. The data management device as recited in claim 1, wherein the operating data includes, for each of the wireless two-wheeled vehicle devices, a data set that includes outputtable, non-editable items of information and modifiable operating parameters for the wireless two-wheeled vehicle device.

8. The data management device as recited in claim 1, wherein the data management device is configured to set up, via the first communication interface, a separate, direct, authenticated and/or encrypted connection with each of the wireless two-wheeled vehicle devices.

9. The data management device as recited in claim 1, wherein the data management device is configured to receive data of a first wireless two-wheeled vehicle device and/or a first two-wheeled vehicle system device, and to provide the received data via a connection to a second wireless two-wheeled vehicle device and/or to a second two-wheeled vehicle system device.

10. A diagnostic device with communication interfaces for a two-wheeled vehicle, configured to diagnose operating data of the two-wheeled vehicle of connections to wireless two-wheeled vehicle devices, and configured for communication with a data management device, the diagnostic device having a first interface comprising a wireless transceiver configured for communication with the data management device, and a second interface comprising a wired connector or bus connection configured for communication with an external cloud storage device, the data management device including a first communication interface configured for wireless communication with the wireless two-wheeled vehicle devices of the two-wheeled vehicle, a second communication interface configured for communication with at least one two-wheeled vehicle system device, a hardware implemented third communication interface comprising a secure communication link configured for authenticated and/or encrypted data exchange with the diagnostic device for an at least partial provision, and/or modification, and/or deletion, and/or retrieval of operating data of the two-wheeled vehicle, and a data manager configured at least for management of operating data of the wireless two-wheeled vehicle devices, the data manager being connected to the third communication interface and being, the processor being configured to receive, and/or to modify, and/or to delete, and/or to provide the operating data, the operating data including: (i) at least data for the communication of one or more of the wireless two-wheeled vehicle devices with the first communication interface, and/or (ii) data for operating and/or diagnosing respective wireless two-wheeled vehicle devices of the two-wheeled device vehicle, and wherein the data manager is configured to communicate, in authenticated and/or encrypted fashion, wirelessly with the one or more of the wireless two-wheeled vehicle devices based on the managed operating data.

11. The diagnostic device as recited in claim 10, wherein the two-wheeled vehicle is an e-bike or a pedelec.

12. The diagnostic device as recited in claim 10, wherein the diagnostic device is configured to carry out at least one of the following:
represent information about wireless connections, represent information of the wireless two-wheeled vehicle devices with which a wireless connection can be set up, create a local copy of the operating data or the at least partial modification of the operating data;
produce operating data for at least one wireless two-wheeled vehicle device;
communicate modified and/or produced operating data to the data management device;
store operating data locally and/or on the external storage device in synchronized fashion.

13. A two-wheeled vehicle, comprising:
a data management device vehicle with communication interfaces for management and/or diagnosis of operating data of the two-wheeled vehicle of connections to wireless two-wheeled vehicle devices of the two-wheeled vehicle, including:
a first communication interface comprising a wireless transceiver configured for wireless communication with the wireless two-wheeled vehicle devices of the two-wheeled vehicle,
a second communication interface comprising a wired connector or bus connection configured for communication with at least one two-wheeled vehicle system device,
a hardware implemented third communication interface comprising a secure communication link configured for authenticated and/or encrypted communication data exchange with a diagnostic device for an at least partial provision, and/or modification, and/or deletion, and/or retrieval of operating data of the two-wheeled vehicle, and a data manager configured at least for management of operating data of the wireless two-wheeled vehicle devices, the data manager being connected to the third communication interface and being, the processor being configured to receive, and/or to modify, and/or to delete, and/or to provide the operating data, the operating data including: (i) at least data for the communication of one or more of the wireless two-wheeled vehicle devices with the first communication interface, and/or (ii) data for operating and/or diagnosing respective wireless two-wheeled vehicle devices of the two-wheeled device vehicle, and wherein the data manager configured to communicate, in authenticated and/or encrypted fashion, wirelessly with the one or more of the wireless two-wheeled vehicle devices based on the managed operating data; and the at least one two-wheeled vehicle system device connected to the second communication interface of the data management device.

14. The two-wheeled vehicle as recited in claim 13, wherein the two-wheeled vehicle is an e-bike or a pedelec.

15. A two-wheeled vehicle system, comprising: a two-wheeled vehicle including:
a data management device vehicle with communication interfaces for management and/or diagnosis of operating data of the two-wheeled vehicle of connections to wireless two-wheeled vehicle devices of the two-wheeled vehicle, the data management device vehicle including:
a first communication interface comprising a wireless transceiver configured for wireless communication with the wireless two-wheeled vehicle devices of the two-wheeled vehicle, a second communication interface comprising a wired connector or bus connection configured for communication comprising a wired connector or bus connection configured to transmit and receive data with at least one two-wheeled vehicle system device, a hardware implemented third communication interface comprising a secure communication link configured for authenticated and/or encrypted communication data exchange with a diagnostic device for an at least partial provision, and/or modification, and/or deletion, and/or retrieval of operating data of the two-wheeled vehicle, and a data manager configured at least for management of operating data of the wireless two-wheeled vehicle devices, the data manager being connected to the third communication interface and being, the processor being configured to receive, and/or to modify, and/or to delete, and/or to provide the operating data, the operating data including: (i) at least data for the communication of one or more of the wireless two-wheeled vehicle devices with the first communication interface, and/or (ii) data for operating and/or diagnosing respective wireless two-wheeled vehicle devices of the two-wheeled vehicle device, and wherein the data manager is configured to communicate, in authenticated and/or encrypted fashion, wirelessly with the one or more of the wireless two-wheeled vehicle devices based on the managed operating data; and the at least one two-wheeled vehicle system device connected to the second communication interface of the data management device vehicle; and a diagnostic device connectable to the data management device vehicle and configured to diagnose the operating data of the two-wheeled vehicle of the connections to wireless two-wheeled vehicle devices, and configured for communication with the data management device vehicle, the diagnostic device having a first interface configured for communication with the data management device vehicle, and a second interface for communication with an external cloud storage device.

16. A method for managing operating data of a two-wheeled vehicle with communication interfaces for management and/or diagnosis of data of connections to wireless two-wheeled vehicle devices of the two-wheeled vehicle device, the method comprising the following steps:

providing the operating data of the wireless two-wheeled vehicle devices through a diagnostic application of a diagnostic device, the operating data including: (i) data for the communication of one or more of the wireless two-wheeled vehicle devices and/or data for the operation, and/or (ii) data for the diagnosis of respective wireless two-wheeled vehicle devices of the two-wheeled vehicle;

storing the operating data in a storage device of a data management device in the two-wheeled vehicle, the data management device including a first communication interface comprising a wireless transceiver configured for wireless communication with the wireless two-wheeled vehicle devices of the two-wheeled vehicle, a second communication interface comprising a wired connector or bus connection configured for communication comprising a wired connector or bus connection configured to transmit and receive data with at least one two-wheeled vehicle system device, a hardware implemented third communication interface comprising a secure communication link configured for authenticated and/or encrypted communication data exchange with a diagnostic device for an at least partial provision, and/or modification, and/or deletion, and/or retrieval of operating data of the two-wheeled vehicle, and a data manager configured at least for management of operating data of the wireless two-wheeled vehicle devices, the data manager being connected to the third communication interface and being, the processor being configured to receive, and/or to modify, and/or to delete, and/or to provide the operating data, the operating data including: (i) at least data for the communication of one or more of the wireless two-wheeled vehicle devices with the first communication interface, and/or (ii) data for operating and/or diagnosing respective wireless two-wheeled vehicle devices of the two-wheeled vehicle device, and wherein the data manager is configured to communicate, in authenticated and/or encrypted fashion, wirelessly with the one or more of the wireless two-wheeled vehicle devices based on the managed operating data;

setting up a communication connection, using the data management device, with a respective wireless two-wheeled vehicle device based on the stored operating data associated with the respective wireless two-wheeled vehicle device; and communicating at least a part of the operating data to the respective wireless two-wheeled vehicle device via the set-up communication connection, for the configuration of the communication connection.

* * * * *